United States Patent
Nüssen et al.

(10) Patent No.: US 11,846,372 B2
(45) Date of Patent: Dec. 19, 2023

(54) HOSE LINE FOR TRANSPORTING ABRASIVE MEDIA AND METHOD AND DEVICE FOR PRODUCTION THEREOF

(71) Applicant: Masterflex SE, Gelsenkirchen (DE)

(72) Inventors: Stefan Nüssen, Gelsenkirchen (DE); Tanja Kapteina, Herne (DE); Joachim Jacobi, Bochum (DE)

(73) Assignee: Masterflex SE, Gelsenkirchen (DE)

( * ) Notice: Subject to any disclaimer, the term of this patent is extended or adjusted under 35 U.S.C. 154(b) by 233 days.

(21) Appl. No.: 17/220,704

(22) Filed: Apr. 1, 2021

(65) Prior Publication Data

US 2021/0239240 A1 Aug. 5, 2021

Related U.S. Application Data

(63) Continuation of application No. 16/317,733, filed as application No. PCT/EP2017/067567 on Jul. 12, 2017, now abandoned.

(30) Foreign Application Priority Data

Jul. 14, 2016 (EP) .................................. 16179469

(51) Int. Cl.
*F16L 55/00* (2006.01)
*F16L 11/118* (2006.01)
(Continued)

(52) U.S. Cl.
CPC ......... *F16L 11/1185* (2013.01); *B29C 48/154* (2019.02); *B29C 48/304* (2019.02);
(Continued)

(58) Field of Classification Search
CPC .... F16L 11/1185; F16L 11/112; F16L 11/127; F16L 11/24; G01M 3/165; G01M 3/18
(Continued)

(56) References Cited

U.S. PATENT DOCUMENTS

| | | | | |
|---|---|---|---|---|
| 2,516,864 A | * | 8/1950 | Gilmore | ................. B29C 65/04 |
| | | | | 264/171.15 |
| 3,058,493 A | ‡ | 10/1962 | Muller | ................. B29C 48/153 |
| | | | | 138/122 |

(Continued)

FOREIGN PATENT DOCUMENTS

| AT | 006114 | ‡ | 4/2003 |
|---|---|---|---|
| AT | 6114 | | 4/2003 |

(Continued)

OTHER PUBLICATIONS

PCT International Search Report and Written Opinion from PCT Application No. PCT/EP2017/067567 entitled Hose Line for Transporting Abrasive Media and Method and Device for Production Thereof(dated Oct. 20, 2017).‡

(Continued)

*Primary Examiner* — James F Hook
(74) *Attorney, Agent, or Firm* — Hovey Williams LLP

(57) ABSTRACT

The present invention relates to a hose line (1) for transporting abrasive media with an electrically conductive reinforcing element (5) running in or on the hose wall (2) and extending in the hose direction (6), wherein an insert (7) made of electrically conducting material is at least partially embedded in the hose wall (2) and extends in the hose direction (6) at a distance from the reinforcing element (5).

19 Claims, 2 Drawing Sheets

Figure 1:
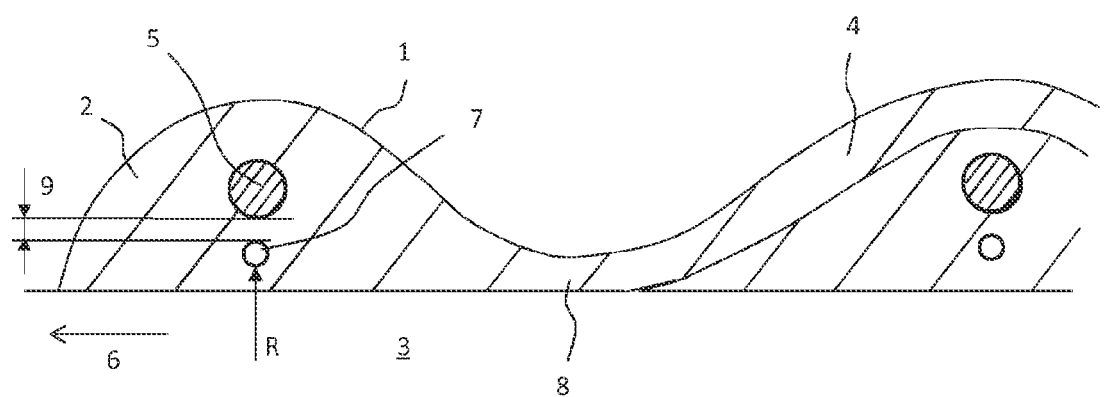

(51) Int. Cl.
    *B29C 48/154*     (2019.01)
    *B29C 48/30*     (2019.01)
    *B29C 53/78*     (2006.01)
    *F16L 11/112*     (2006.01)
    *F16L 11/24*     (2006.01)
    *G01M 3/16*     (2006.01)
    *G01M 3/18*     (2006.01)
    *F16L 11/127*     (2006.01)
    *B29K 701/12*     (2006.01)
    *B29K 705/00*     (2006.01)
    *B29L 23/00*     (2006.01)

(52) U.S. Cl.
    CPC ........... *B29C 53/785* (2013.01); *F16L 11/112* (2013.01); *F16L 11/127* (2013.01); *F16L 11/24* (2013.01); *G01M 3/165* (2013.01); *G01M 3/18* (2013.01); *B29K 2701/12* (2013.01); *B29K 2705/00* (2013.01); *B29K 2995/0005* (2013.01); *B29L 2023/005* (2013.01)

(58) Field of Classification Search
    USPC .................................. 138/104, 36, 127, 133
    See application file for complete search history.

(56) References Cited

U.S. PATENT DOCUMENTS

| | | | | |
|---|---|---|---|---|
| 3,721,898 A | * | 3/1973 | Dragoumis | G01M 3/045 |
| | | | | 138/104 |
| 3,860,742 A | ‡ | 1/1975 | Medney | H01R 4/60 |
| | | | | 174/84 S |
| 4,029,889 A | * | 6/1977 | Mizuochi | G01M 3/165 |
| | | | | 138/104 |
| 4,140,154 A | ‡ | 2/1979 | Kanao | F16L 11/10 |
| | | | | 138/122 |
| 4,167,953 A | ‡ | 9/1979 | Carlstrom | F16L 59/18 |
| | | | | 138/133 |
| 4,229,613 A | ‡ | 10/1980 | Braun | B29D 23/001 |
| | | | | 138/103 |
| 4,870,535 A | * | 9/1989 | Matsumoto | B65G 53/52 |
| | | | | 138/122 |
| 5,702,132 A | ‡ | 12/1997 | Friederich | F16L 11/081 |
| | | | | 138/127 |
| 6,386,237 B1 | * | 5/2002 | Chevalier | F16L 11/12 |
| | | | | 138/104 |
| 6,539,981 B1 | * | 4/2003 | Kleven | G01F 1/64 |
| | | | | 138/104 |
| 9,322,501 B1 | * | 4/2016 | Carlson | B29C 53/785 |
| 2003/0183294 A1 | ‡ | 10/2003 | Carlson | B29C 53/585 |
| | | | | 138/129 |
| 2012/0175005 A1 | * | 7/2012 | Andersen | F16L 57/06 |
| | | | | 138/104 |
| 2012/0278018 A1 | | 11/2012 | Hastreiter | |
| 2013/0061971 A1 | ‡ | 3/2013 | Chamberland | F16L 9/125 |
| | | | | 138/104 |
| 2014/0037276 A1 | ‡ | 2/2014 | Carlson | B29C 53/785 |
| | | | | 392/468 |
| 2014/0366979 A1 | * | 12/2014 | Mollen | F16L 11/127 |
| | | | | 138/137 |

FOREIGN PATENT DOCUMENTS

| | | | |
|---|---|---|---|
| CN | 1856676 | | 11/2006 |
| CN | 201401569 | | 2/2010 |
| CN | 202791118 | | 3/2013 |
| CN | 104956135 | | 9/2015 |
| CN | 205136845 | | 4/2016 |
| DE | 29602061 | | 3/1996 |
| DE | 29602061 | ‡ | 5/1996 |
| DE | 69932950 | | 4/2007 |
| EP | 0185650 | | 9/1988 |
| EP | 2304294 | | 5/2013 |
| JP | H09119584 | | 5/1997 |
| JP | 3440658 | | 6/2003 |
| JP | 3440658 | ‡ | 8/2003 |
| JP | 5340714 | | 8/2013 |
| WO | 2014005064 | | 1/2014 |
| WO | WO-2014119162 | ‡ | 8/2014 |

OTHER PUBLICATIONS

European Search Report from European Patent Application No. 16179469.8 entitled Hose Line for Transporting Abrasive Media and Method and Device for Production Thereof (dated Jan. 19, 2017).‡

Office Action from Chinese Patent Application No. 201780043687.9 entitled Hose Line for Transporting Abrasive Media and Methods and Device for Production Thereof (dated Jun. 29, 2020).

Notice of Opposition filed against European Patent No. 3485190 (dated Feb. 8, 2022).

\* cited by examiner
‡ imported from a related application

HOSE LINE FOR TRANSPORTING ABRASIVE MEDIA AND METHOD AND DEVICE FOR PRODUCTION THEREOF

CROSS REFERENCE TO RELATED APPLICATIONS

The present application is a continuation of U.S. patent application Ser. No. 16/317,733, filed Jan. 14, 2019, which is a U.S. National Phase Application pursuant to 35 U.S.C. § 371 of International Application No. PCT/EP2017/067567, filed Jul. 12, 2017, claiming priority of European Application No. 16179469.8, filed Jul. 14, 2016, each of which is hereby incorporated in its entirety by reference herein.

BACKGROUND OF INVENTION

1. Field of Invention

The invention relates to a hose line for transporting abrasive media with an electrically conductive reinforcing element running in or on the hose wall and extending in the hose direction. Furthermore, the invention relates to a method and a device for the production thereof.

2. Discussion of Prior Art

In many technical fields there is the requirement to convey or extract solids, gases or liquids. The hose lines used for this are often exposed to high stresses because the transported medium can cause substantial abrasion of the inner side of the hose wall. After a certain period of time this results in damage to the hose wall. As a consequence, leakage from the hose line can result. Often it is also required that the hose lines are accompanied by a certain degree of flexibility, which has the result that the lines are also exposed to frequent bending loads. For these intended uses, hose lines with a helically or spirally running reinforcing coil which combine high flexibility and resistance are known in particular. These are in particular extruded plastic profiles with spring steel wire moulded in so as to be rotatably and slidably fixed.

The occurrence of leakage as a result of wear due to abrasion or due to an undetected breakage of a hose line or of a reinforcing coil is generally associated with high costs and substantial effort to rectify the damage event. As the wear of the hose inner wall is not detectable from the outside, the hose line is often not replaced early enough.

SUMMARY

The object of the present invention is therefore to provide a hose line which makes it possible to identify wear of the hose line early enough before a leak occurs.

This object is achieved by a method with the features of claim 1 and by a system with the features of claim 13.

According to the invention it is provided that an insert made of electrically conducting material is at least partially embedded in the hose wall and extends in the hose direction at a distance from the reinforcing element.

The insert made of electrically conducting material forms an electrical conductor which extends in the hose direction or in the longitudinal direction of the hose at a distance from the reinforcing element, with the result that the insert and the reinforcing element are not electrically connected to each other, or are electrically isolated from each other. As both the reinforcing element and the insert are electrically conducting, they can be integrated into a monitoring circuit. In such a monitoring system, after the hose line has been laid, the first end of the hose line and the first end of the insert are connected to an electrical ohmmeter or continuity tester. As the insert and the reinforcing element in the hose wall are electrically isolated from each other, the reinforcing element and the insert are electrically connected to each other at the second end or on any other section in order to close the electric circuit. For example, the reinforcing element and the insert can be electrically connected to each other at the second end by a clamp, a contact shoe or another contact element, such as an electrically conductive rivet. Furthermore, for example, a pin can be pushed into the hose line, in particular into the electrically conducting material, and then an electrical connection between the pin and the reinforcing element (for example through a wire or a cable) can be produced. An electrically conducting adhesive strip is also possible. If, as a result of strong abrasion of the inner wall of the hose line or as a result of a breakage of the hose line, the reinforcing element or the insert becomes damaged, the electrical resistance measured also changes, which can be registered and indicated by the ohmmeter. Users thus receive a message about the state of the hose line in good time and can take appropriate countermeasures. A break in the electrical connection can also be easily detected using a continuity tester or a continuity meter.

The reinforcing element can be completely embedded in the hose wall, with the result that it is separated from the hose interior and the hose exterior by the hose wall. It is also possible for the reinforcing element to be only partially embedded in the hose wall and for a section of the reinforcing element to be exposed towards the hose interior or hose exterior. The insert made of electrically conducting material can also be embedded in the hose wall such that the hose wall completely surrounds the insert. However, it is also possible for the insert to be only partially accommodated by the hose wall and, for example, for an inner section of the insert to be exposed towards the hose interior. For this, the insert can also be fixed on the inner side of the hose wall.

According to the invention it is provided that the electrically conducting material and/or the reinforcing element are separated from the hose interior by a wearing layer. The wearing layer can be part of the insert and/or be formed by a section of the hose wall. Through the choice of the thickness of the wearing layer, a predetermined degree of wear and tear can be established at which the wear warning function is to become active.

In principle it is possible for the hose wall to consist of several plies or layers in a sandwich construction. For this, several film layers can be laid one over another. The electrically conducting material can be arranged between two of the plies. The electrically conducting material is advantageously separated from the inner side of the hose by one or more layers or by a wearing layer of its own. Equally, the electrically conducting material can be attached to the inner side of the hose. The reinforcing element can likewise be arranged between two layers. However, it is also possible to fix, for example weld, the reinforcing element to the outer side or inner side of the layer assembly.

The hose line preferably consists of thermoplastic. Merely by way of example and in a non-limiting manner, there may be mentioned for this thermoplastic elastomers based on urethane (TPU), i.e. polyurethane (PU), such as e.g. polyether polyurethane and polyester polyurethane, polyvinyl chloride (PVC) or polyethylene (PE), but also thermoplastic vulcanizates (TPV), such as Santoprene. Further suitable materials are in particular thermoplastic elastomers, such as:

TPA (thermoplastic copolyamides)
TPC (thermoplastic polyester elastomers/thermoplastic copolyesters)
TPO (thermoplastic elastomers based on olefin), e.g. PP/EPDM
TPS (styrene block copolymers, e.g. SBS, SEBS, SEPS, SEEPS and MBS).

According to a preferred embodiment of the invention the hose line has a helically or spirally running material web which forms the hose wall or at least a layer thereof, as well as a helically or spirally running reinforcing element which is secured on or in the hose wall. The material web, which is coiled to form the hose line, is preferably an extruded profiled rim made of thermoplastic.

Such hose lines with helically running reinforcing coil can be produced in such a way that a material web on which the reinforcing coil is secured is wound in the form of a spiral. A known method provides that a material web extruded as a profiled rim is wound around a manufacturing mandrel or the like and the part of the web already wound onto the manufacturing mandrel is pulled off it axially, with the result that the web is wound helically. The edge area of the web section newly impinging on the manufacturing mandrel is connected to the edge area of the web section which has already looped around the mandrel once. In this way it is possible to form a hose line which is provided with a helically running reinforcing element. The longitudinal edge sections of neighbouring coil turns or the opposing edge areas of the material web can be connected to each other in an overlapping manner.

In addition to an extruded profiled rim, a film strip can also be provided as material web, wherein the film strip is coiled in such a way that neighbouring edge areas overlap. The overlapping edge areas are preferably connected to each other by welding.

According to the invention the electrically conducting material can extend axially parallel to the hose axis. A preferred embodiment provides that the electrically conducting material extends helically or spirally in the hose direction. According to a further embodiment of the invention the reinforcing element extends substantially parallel to the electrically conducting material in the hose direction or along the hose axis, wherein a substantially constant distance between the two electrical conductors, i.e. the insert and the reinforcing element, is preserved.

A particularly preferred embodiment provides a helically running reinforcing element, wherein the electrically conducting material likewise extends helically in the hose direction. The two helices can run parallel to each other, for example in the radial direction, wherein one helix surrounds the other helix.

A further embodiment provides that the helically running reinforcing element and the helically running electrically conducting material are axially offset relative to each other, with the result that in a top view onto the hose axis the helix of one element runs between neighbouring turns of the other element. The helices can run with a radial offset to each other or have substantially the same distance from the hose axis, with the result that they extend in the manner of a double helix or double coil with parallel spirals in the hose direction. In this way particularly reliable measurement results for the electrical resistance and thus a particularly reliable wear warning and/or breakage warning can be achieved.

The reinforcing element is preferably a wire or a wire spiral, such as e.g. a spring steel wire. In an embodiment the wire or the wire spiral can be sheathed by or coated with a plastic in order to make it easier to attach the reinforcing element to the hose line by means of welding, e.g. in the production of hose lines with support coil fitted on. In a further embodiment the reinforcing element comprises an electrically conductive plastic instead of the wire or the wire spiral. For this, in principle all thermoplastics which can be electrically conductively equipped are suitable, such as is described further below in connection with the insert made of electrically conductive material. Rigid polymers, such as e.g. polyamide (PA), polypropylene (PP) or rigid PVC, are preferred.

According to the invention the electrically conducting material can comprise a metal wire and/or electrically conductive plastic. In principle, however, other suitable materials also come into consideration, if they have the necessary electrical conductivity.

A wire strand embedded in the hose wall has proved to be an economical and efficient solution. If abrasion of the wearing layer located under the strand results during use of the hose line, the strand becomes increasingly exposed. The individual conductors of the strand are then separated in a short period of time by the transported medium, whereby the electrical continuity through the strand and the reinforcing element is interrupted. The ohmmeter registers a change in the electrical resistance and is set up to output a warning about this. The same applies to a breakage of the reinforcing element or of the electrical conductor. This can also be easily detected with a continuity meter.

According to the invention an electrically conductive plastic can also be used. So-called conductive polymers are plastics with electrical conductivity which is comparable to that of metals. The electrical conductivity of plastics, such as e.g. PE, PU or PVC, can be modified for example by compounding, in which additives, such as carbon fibres, graphite, metal powder, carbon nanotubes or steel fibres are added to the plastic melt. It is therefore possible to provide substantially the same plastic for the wall of the hose line and for the electrically conducting insert, wherein the wall and the insert differ only with respect to the electrical conductivity if corresponding additives are added to the insert. Thus a further embodiment of the invention provides that the insert and the hose wall consist of the same plastic type, which is advantageous with respect to the adhesion between the two plastics.

A further embodiment of the invention provides that the electrically conducting material lies closer to the hose axis or closer to the hose inner wall in the radial direction than the reinforcing element. The increasing abrasion of the inner hose wall has an effect on the electrically conducting material first, before the reinforcing element of the hose line is damaged. Such an arrangement offers the particular advantage that after a wear warning which is triggered by a complete or partial separation of the electrically conducting material of the insert the hose line can still continue to be used for a certain time before failure of the hose line (leakage) results. In this way a so-called time buffer is obtained and it is possible to react to an imminent failure of the product in good time and to schedule a maintenance date before spontaneous stoppage due to a worn-out hose results. It has proved to be particularly advantageous in this regard if the electrically conducting material lies between the reinforcing element and the hose interior or the hose longitudinal axis in the radial direction.

In a development of the concept of the invention it is furthermore provided that the reinforcing element and the electrically conducting material are separated from each other by an isolating layer. Not only does an isolating layer ensure the functional reliability of the electric circuit, but the duration of the above-described time buffer can also be controlled via the thickness of the isolating layer.

According to a first aspect the method according to the invention for producing a material web for a hose line made of thermoplastic for abrasive media, in particular such as are described herein, provides that a plastic melt is fed into an extrusion head to form an extruded material web and an electrically conductive reinforcing element is connected to the material web during the extrusion of the material web. According to the invention an electrically conducting material is fed into the extrusion head to form an insert in the material web and introduced into the material web at a defined distance from the reinforcing element during the extrusion of the material web.

As has already been explained in relation to the hose line, the reinforcing element and the insert can be embedded in the material web completely or only partially.

A further embodiment of the invention provides that the insert consists of electrically conductive thermoplastic, wherein the material web and the insert are brought together by coextrusion. As has already been explained, the properties of the plastic can be modified by compounding. In the coextrusion a further extruder is used in addition to the main extruder, with the result that at least two plastic melts are brought together before leaving the extrusion device or a profiled template. The two extrudates are fed into the extrusion head and pressed through the die or the template by the pressure of the emerging materials. The insertion of the electrically conductive plastic into the material web is effected at a predefined point. The result is for example a material web with an electrically conductive strip.

According to a further embodiment of the invention the electrical conductor consists of metal wire, preferably of a strand. The strand is guided into the extrusion head, and the extrudate is at least partially extruded onto the strand.

Instead of connecting the reinforcing element and the electrically conducting material to the plastic during the extrusion thereof, according to a second aspect an alternative method can also be used. This method for producing a hose line for abrasive media provides that an already extruded material web made of thermoplastic is wound helically to form a hose line and neighbouring longitudinal edge sections of the material web are connected to each other, e.g. by welding, in an overlapping manner and an electrically conductive reinforcing element is connected to the plastic in such a way that the reinforcing element extends helically in the hose direction. According to the invention it is provided that an electrically conducting material is attached to the hose line in such a way that it extends in the hose direction at a distance from the reinforcing element, wherein at least one of the reinforcing element and the electrically conducting material is attached to the extruded material web, thus after the extrusion thereof.

There are several possibilities available for this method. For example, the reinforcing element, e.g. the wire spiral described herein, can be wound on spirally or helically with the plastic web, wherein the reinforcing element is laid between overlapping longitudinal edge sections of the material web and is fixed there by connection of the longitudinal edge sections. The reinforcing element here is located directly between sections of the material webs adjoining each other in the manner of a pocket and no additional fixing of the reinforcing element, for example by welding it on, is required. The process with the electrically conducting material can be the same.

It is equally possible to secure the reinforcing element, preferably a coated wire, on the extruded material web by welding. Thus the material web can be wound helically to form a hose line and neighbouring longitudinal edge sections of the material web can be connected to each other in an overlapping manner, as described above, wherein the reinforcing element is welded onto the already connected hose sections or onto other sections of the hose line. The process with the electrically conducting material can be the same.

In a development of the concept of the invention one of the reinforcing element and the electrically conducting material can be connected to the material web during the extrusion thereof, for example can be at least partially embedded in it, and the other of the reinforcing element and the electrically conducting material can be attached to the extruded material web. The electrically conducting material can be introduced directly into the material web for example as part of the extrusion thereof, as described above, whereas the reinforcing element is not connected to the material web until after the extrusion. This procedure can of course also be reversed.

Within the framework of the method according to the invention it is furthermore provided that the hose line is formed of several plastic layers or plies at least in sections, wherein the reinforcing element and/or the electrically conducting material is at least partially introduced between two adjoining plastic layers. This procedure proves to be advantageous in particular in the case of hose lines which are constructed in the manner of a sandwich, as elaborate fixing mechanisms for the reinforcing element and/or the electrically conducting material can be dispensed with.

The invention furthermore relates to a device for producing hose lines made of thermoplastic with a reinforcing element at least partially embedded in the hose wall, in particular for producing hose lines such as are described herein, in particular by means of a method according to the first aspect such as is described herein. The device comprises an extrusion head for extruding a material web, wherein the extrusion head has at least one feed channel for flowable plastic from at least one extruder, wherein the reinforcing element is guided into the extrusion head in order to at least partially embed the reinforcing element in the plastic during the extrusion of the material web. A first guide section is set up to guide the reinforcing element in and/or into the extrusion head, with the result that the reinforcing element is integrated into the plastic in a defined or predetermined position. According to the invention a further, second guide section for an electrical conductor (insert), such as a wire strand or the like, is provided. The electrical conductor is fed into the extrusion head in order to be at least partially embedded in the plastic. The second guide section is formed in such a way that the electrical conductor is embedded in the plastic at a defined distance from the reinforcing element along the material web.

A further embodiment of the invention provides that the first and second guide sections comprise ducts, preferably arranged parallel to each other, for the reinforcing element and the electrical conductor. The guide sections can be guided into the extruder for example through two ducts in an entry guide in the manner of a double tube. The guide sections are arranged in such a way that the reinforcing element and the electrical conductor are held at a predetermined distance from each other when they are embedded in the plastic.

According to the invention it is preferred that the material web is extruded as a profiled rim. In order to shape the extruded plastic, a profiled template is provided which is part of the extrusion head or is attached thereto.

The invention furthermore relates to the use of a hose line for abrasive media, such as is described herein, in a monitoring system for monitoring the state, in particular the wear, of a hose line, wherein a first end of the reinforcing element and a first end of the insert made of electrically conducting material are connected to an electrical ohmmeter or continuity tester at a first end of the hose line and wherein the reinforcing element and the insert are electrically connected to each other at the second end of the hose line or on another section of the hose line. As a result of the electrical connection of reinforcing element, ohmmeter or continuity tester and insert, an electric circuit is closed. In other words, the reinforcing element, the ohmmeter or continuity tester and the insert are integrated into an electric circuit.

If, as a result of strong abrasion of the inner wall of the hose line or as a result of a breakage of the hose line, the reinforcing element or the insert becomes damaged, the electrical resistance measured also changes, which can be registered and indicated by the ohmmeter or the continuity tester.

In particular clamps, contact shoes, rivets, pins or electrically conducting adhesive strips, as already described, are suitable as connection elements for producing an electrical connection between the reinforcing element and the insert. In principle, however, other contact elements which are suitable for an electrically conducting connection between the reinforcing element and the insert can also be used.

Moreover, the invention relates to a monitoring system for monitoring the state, in particular the wear, of a hose line. The system comprises a hose line for abrasive media, such as is described herein, as well as an electrical ohmmeter or continuity tester, wherein a first end of the reinforcing element and a first end of the insert made of electrically conducting material are connected to the electrical ohmmeter or continuity tester at a first end of the hose line and wherein the reinforcing element and the insert are electrically connected to each other at the second end of the hose line or on another section of the hose line. As a result of the electrical connections between reinforcing element, ohmmeter or continuity tester and insert, an electric circuit is closed.

The monitoring system can in principle be formed as a system for wear warning in a hose line.

BRIEF DESCRIPTION OF THE DRAWING FIGURES

Figure 2:
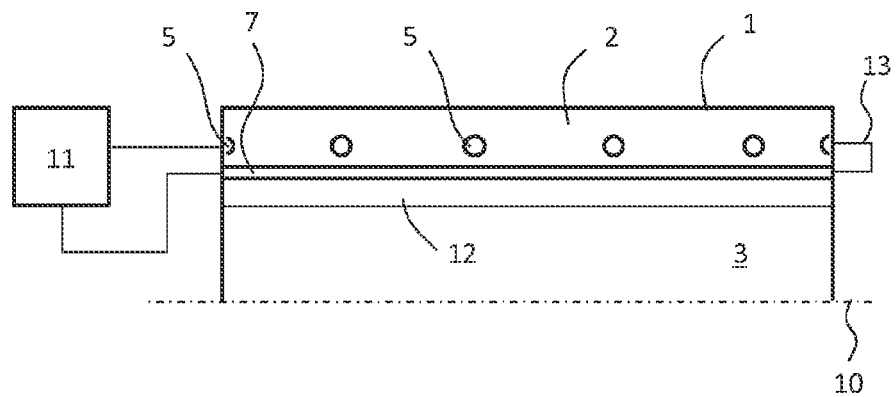
Figure 3:
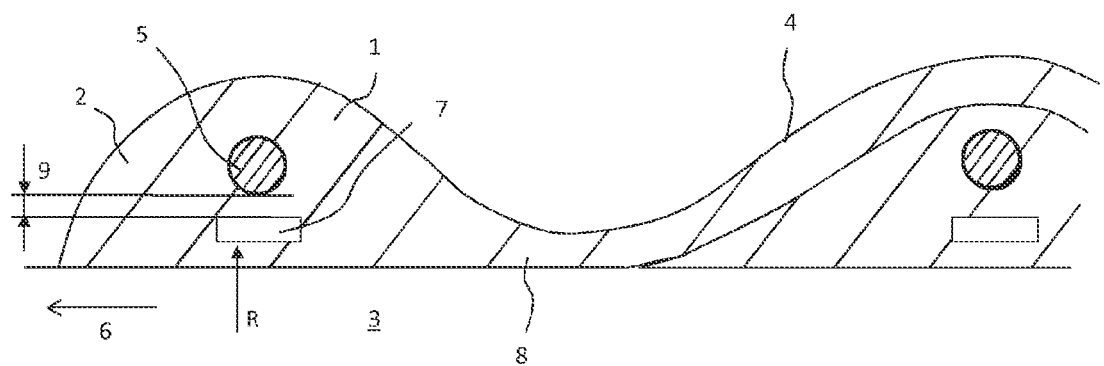
Figure 4:
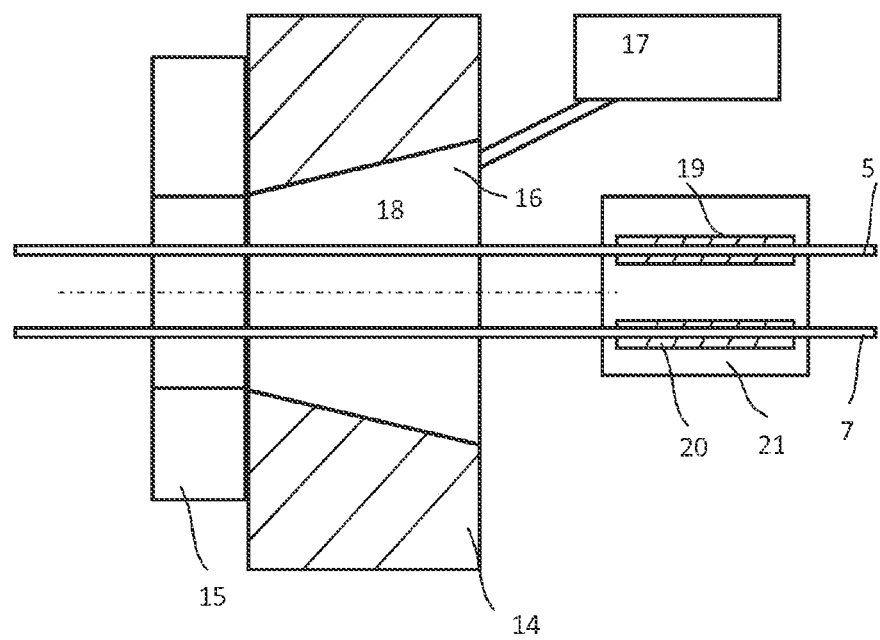

The present invention is explained in more detail in the following with reference to merely preferred embodiment examples and the drawings. There are shown in:

FIG. 1 a hose line according to a first embodiment of the invention in a sectional view;

FIG. 2 a diagram of the monitoring of a hose line according to a second embodiment of the invention;

FIG. 3 a hose line according to a third embodiment of the invention in a sectional view; and FIG. 4 a device according to the invention in a sectional view.

DETAILED DESCRIPTION OF THE PREFERRED EMBODIMENT

FIG. 1 shows a section of a hose line 1 or of a hose with a hose wall 2 which surrounds the hose interior 3. The hose line 1 has a helically running material web 4, which forms the hose wall 2. The material web 4 is a spirally coiled extruded profiled rim with embedded reinforcing element 5 in the form of a wire spiral, which likewise extends helically in the hose direction or in the longitudinal direction 6 of the hose line 1. The reinforcing element 5 is electrically conducting.

An insert 7 made of electrically conducting material in the form of a wire strand is likewise embedded in the hose wall 2. The strand 7 lies closer to the hose inner wall 8 or to the hose longitudinal axis in the radial direction R than the reinforcing element 5. In the embodiment example represented the insert 7 follows the course of the reinforcing element 5 at a distance 9 in parallel and extends helically around the hose longitudinal axis in the longitudinal direction of the hose.

Hoses of the type represented are used in particular for transporting abrasive media. If necessary, the hose can be cut to the desired length. As a result of wear the thickness of the hose wall 2 can decrease, resulting in leakage. Also, in the course of the laying or during dynamic movement in operation, such hoses can be exposed to stresses from the outside, such as for example bending stresses. A breakage of the hose line and in particular of the reinforcing coil can result. Regarding this, FIG. 2 shows a system for wear warning in the case of a hose line according to the invention.

The hose line 1 represented here is shortened to the desired size and, like the hose line in FIG. 1, has a helically running material web and a correspondingly running reinforcing element 5. In this embodiment, however, the insert 7 runs parallel to the longitudinal axis 10 of the hose line 1. The left-hand end of the hose wall 2 is exposed. The end of the reinforcing element 5 and the end of the insert 7 are connected to an ohmmeter 11. In order to close the electric circuit, at the other end of the hose line 1 the reinforcing element 5 and the insert 7 are electrically connected to each other. In the embodiment example represented here an electrically conducting clamp 13 is secured to the end of the hose line 1, with the result that the clamp 13 comes into contact with the reinforcing element 5 and with the insert 7 and closes the electric circuit. Alternatively, a pin can also be pushed into e.g. the front end of the insert 7 and then connected to the reinforcing element 5 e.g. via a small cable.

The section of the wall between the hose interior 3 and the insert 7 acts as a wearing layer 12. If, as a result of wear, there is a reduction in the wall thickness of the hose wall 2, the insert 7, which is formed in the form of a wire strand, is exposed first, before the reinforcing element 5 is damaged. As a result of further abrasion, individual conductors of the strand are separated, whereby the measured electrical resistance changes. This can be indicated by the ohmmeter 11. The user thus receives an early warning of an impending leakage. The material layer between the reinforcing element 5 and the insert 7 effectively acts as a time buffer. If there is a breakage of the hose line 1 and/or if the reinforcing element 5 or the insert 7 is damaged, a corresponding response is likewise received. Instead of a clamp, other electrically conducting means for electrically connecting the reinforcing element to the insert are also possible. For example, at the other end of the hose line 1 an electrically conducting adhesive strip or the like can be attached, which connects the ends of the reinforcing element 5 and the insert 7 to each other in an electrically conducting manner.

The hose line 1 in FIG. 3 is constructed substantially the same as the hose line from FIG. 1. Instead of a wire strand, the insert 7 consists of an electrically conducting material in the form of extruded plastic which has been coextruded together with the material web 4 and in the process has been introduced into the material web 4. In the embodiment example represented here the plastic of the insert 7 corresponds substantially to that of the hose wall 2 or of the material web 4, but has been modified with respect to its electrical conductivity by the addition of additives. If, as a result of increasing wear, there is damage to the insert, the measured resistance of the already discussed electric circuit also changes here and allows a conclusion to be drawn as to the state of the hose line 1.

FIG. 4 shows a device 14 for extruding plastic in the form of an extrusion head with a profiled template 15. The extrusion head 14 has an inlet 16 for an extrudate in the form of molten plastic, which is provided by an extruder 17. A channel 18 passes through the extrusion head 14. The extrudate flows through the channel 18, is fed into the profiled template 15 and moulded to form a profiled rim.

As part of the extrusion process, the reinforcing element 5 is also to be embedded in the extruded material web. For this, the reinforcing element 5 (here a wire) is guided into the channel 18 of the extrusion head 14 and surrounded by the extrudate, with the result that the reinforcing element 5 is embedded in the extruded plastic after leaving the profiled template 15. The correct position of the reinforcing element 5 in the extruded material web or in the channel 18, where the reinforcing element 5 is melted into the plastic, is ensured by a first guide section 19.

An electrical conductor or an insert 7 made of electrically conducting material is to be embedded in the material web likewise and in a defined position relative to the reinforcing element 5. The electrical conductor 7 comprises a wire strand, which is guided parallel to the reinforcing element 5 into the extrusion head 14 and melted into the plastic. The position of the insert 7 relative to the reinforcing element 5 is ensured by a second guide section 20, which guides the insert 7 parallel to the reinforcing element 5. The first guide section 19 and the second guide section 20 are formed by two passages in a sheath-like element 21. The sheath-like element 21 has the form of a double tube.

LIST OF REFERENCE NUMBERS

1 Hose line
2 Hose wall
3 Hose interior
4 Material web
5 Reinforcing element
6 Longitudinal direction (hose direction)
7 Insert made of electrically conducting material
8 Hose inner wall
9 Distance between reinforcing element and insert
10 Longitudinal axis of the hose line
11 Ohmmeter
12 Wearing layer
13 Clamp
14 Extrusion device
15 Profiled template
16 Inlet
17 Extruder
18 Channel
19 First guide section
20 Second guide section
21 Double tube

The invention claimed is:

1. A method of preparing a hose line for use in a monitoring system for monitoring the state of the hose line, wherein the hose line is configured to transport abrasive media along a hose direction, and wherein the hose line includes a hose wall, an electrically conductive reinforcing element running in or on the hose wall and extending in the hose direction, and an insert made of electrically conducting material, said method comprising the steps of:
   (a) at least partially embedding the insert in the hose wall such that the insert extends in the hose direction at a distance from the reinforcing element;
   (b) at a first end of the hose line, connecting a first end of the reinforcing element and a first end of the insert to an electrical ohmmeter or continuity tester; and
   (c) at the second end of the hose line or on another section of the hose line, electrically connecting the reinforcing element and the insert to each other so that the reinforcing element, the ohmmeter or continuity tester, and the insert are integrated into an electric circuit.

2. The method according to claim 1, wherein the electrically conducting material and/or the reinforcing element are separated from a hose interior by a wearing layer.

3. The method according to claim 2, wherein the hose line has a helically running material web, which forms the hose wall, and has a helically running reinforcing element, which is secured on or in the hose wall.

4. The method according to claim 3, wherein the electrically conducting material comprises a metal wire and an electrically conductive plastic.

5. The method according to claim 4, wherein the electrically conducting material lies closer to the hose axis in the radial direction than the reinforcing element.

6. The method according to claim 3, wherein the electrically conducting material lies closer to the hose axis in the radial direction than the reinforcing element.

7. The method according to claim 3, wherein the reinforcing element and the electrically conducting material are separated from each other by an isolating layer.

8. The method according to claim 1, wherein the hose line has a helically running material web, which forms the hose wall, and has a helically running reinforcing element, which is secured on or in the hose wall.

9. The method according to claim 1, wherein the electrically conducting material comprises a metal wire and an electrically conductive plastic.

10. The method according to claim 1, wherein the electrically conducting material lies closer to the hose axis in the radial direction than the reinforcing element.

11. The method according to claim 1, wherein the reinforcing element and the electrically conducting material are separated from each other by an isolating layer.

12. The method according to claim 1, wherein the state is the wear of the hose line.

13. Monitoring system for monitoring the state of a hose line, the system comprising:
   a hose line, wherein the hose line comprises a hose wall, an electrically conductive reinforcing element running in or on the hose wall and extending in a hose direction, and an insert made of electrically conducting material, wherein the insert is at least partially embedded in the hose wall and extends in the hose direction at a distance from the reinforcing element; and
   an electrical ohmmeter or continuity tester, wherein, at a first end of the hose line, a first end of the reinforcing element and a first end of the insert are connected to the electrical ohmmeter or continuity tester, and wherein the reinforcing element and the insert are electrically connected to each other at a second end of the hose line or on another section of the hose line so that the reinforcing element, the ohmmeter or continuity tester, and the insert are integrated into an electric circuit.

14. Monitoring system according to claim 13, wherein the electrically conducting material and/or the reinforcing element are separated from a hose interior by a wearing layer.

15. Monitoring system according to claim 13, wherein the hose line has a helically running material web, which forms the hose wall, and has a helically running reinforcing element, which is secured on or in the hose wall.

16. Monitoring system according to claim 13, wherein the electrically conducting material comprises a metal wire and/or an electrically conductive plastic.

17. Monitoring system according to claim 13, wherein the electrically conducting material lies closer to the hose axis in the radial direction than the reinforcing element.

18. Monitoring system according to claim 13, wherein the reinforcing element and the electrically conducting material are separated from each other by an isolating layer.

19. Monitoring system according to claim 13, wherein the state is the wear of the hose line.

* * * * *